(12) United States Patent
Huang et al.

(10) Patent No.: US 9,544,900 B2
(45) Date of Patent: Jan. 10, 2017

(54) ANTENNA CONTROL SYSTEM AND METHOD

(71) Applicants: AMBIT MICROSYSTEMS (SHANGHAI) LTD., Shanghai (CN); HON HAI PRECISION INDUSTRY CO., LTD., New Taipei (TW)

(72) Inventors: Xiao-Gang Huang, Shanghai (CN); Jun Ding, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 477 days.

(21) Appl. No.: 14/086,981

(22) Filed: Nov. 22, 2013

(65) Prior Publication Data

US 2014/0254507 A1    Sep. 11, 2014

(30) Foreign Application Priority Data

Mar. 6, 2013   (CN) .......................... 2013 1 0072153

(51) Int. Cl.
*H04W 72/04*    (2009.01)
*H01Q 1/24*    (2006.01)

(52) U.S. Cl.
CPC ........... *H04W 72/046* (2013.01); *H01Q 1/246* (2013.01)

(58) Field of Classification Search
CPC .............................. H04W 72/046; H01Q 1/246
See application file for complete search history.

(56) References Cited

U.S. PATENT DOCUMENTS

| 7,742,499 | B1* | 6/2010 | Erskine | H04L 12/5695 |
| | | | | 370/352 |
| 2006/0084461 | A1* | 4/2006 | Sekiya | H04B 7/0693 |
| | | | | 455/522 |
| 2009/0180429 | A1* | 7/2009 | Stevens | H04L 5/0023 |
| | | | | 370/329 |
| 2011/0312353 | A1* | 12/2011 | Banister | H04B 7/0691 |
| | | | | 455/500 |
| 2012/0243513 | A1* | 9/2012 | Fujishima | H04W 72/085 |
| | | | | 370/329 |

(Continued)

*Primary Examiner* — Andrew Lai
*Assistant Examiner* — Sumitra Ganguly
(74) *Attorney, Agent, or Firm* — Zhigang Ma

(57) ABSTRACT

A wireless router applying an antenna control method includes a number of antennas and communicates with a number of terminal devices via the antennas. The antenna control method includes detecting a current bandwidth $B_{cur}$ of each terminal device communicating with the wireless router and determining a maximum bandwidth $B_{max}$ of each of the terminal devices, computing a weighted sum SUMB of the bandwidths of the terminal devices according to the detected current bandwidth $B_{cur}$ and the maximum bandwidth $B_{max}$ of each terminal device, comparing the weighted sum SUMB of the bandwidths with a first preset value, and turning on or turning off at least one of the antennas according to the compared result. A wireless router is also provided.

10 Claims, 2 Drawing Sheets

(56) References Cited

U.S. PATENT DOCUMENTS

2013/0171983 A1\* 7/2013 Zhang ............... H04W 52/0206
 455/422.1
2014/0093012 A1\* 4/2014 Zhang ................. H04B 7/0691
 375/295

\* cited by examiner

ANTENNA CONTROL SYSTEM AND METHOD

BACKGROUND

1. Technical Field

The present disclosure relates to antenna control systems applied in wireless routers, and particularly to an antenna control system and method applied in a wireless router.

2. Description of Related Art

Wireless routers can communicate with a number of terminal devices. Wireless routers can employ a number of antennas to enhance communication efficiency. However, if a terminal device is close to the wireless router, it would be a waste of resources to turn on all the antennas.

Therefore, it is desirable to provide an antenna control system and method to power a necessary number of antennas.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding units throughout the several views.

DETAILED DESCRIPTION

Embodiments of the present disclosure are described with reference to the accompanying drawings.

Figure 1:
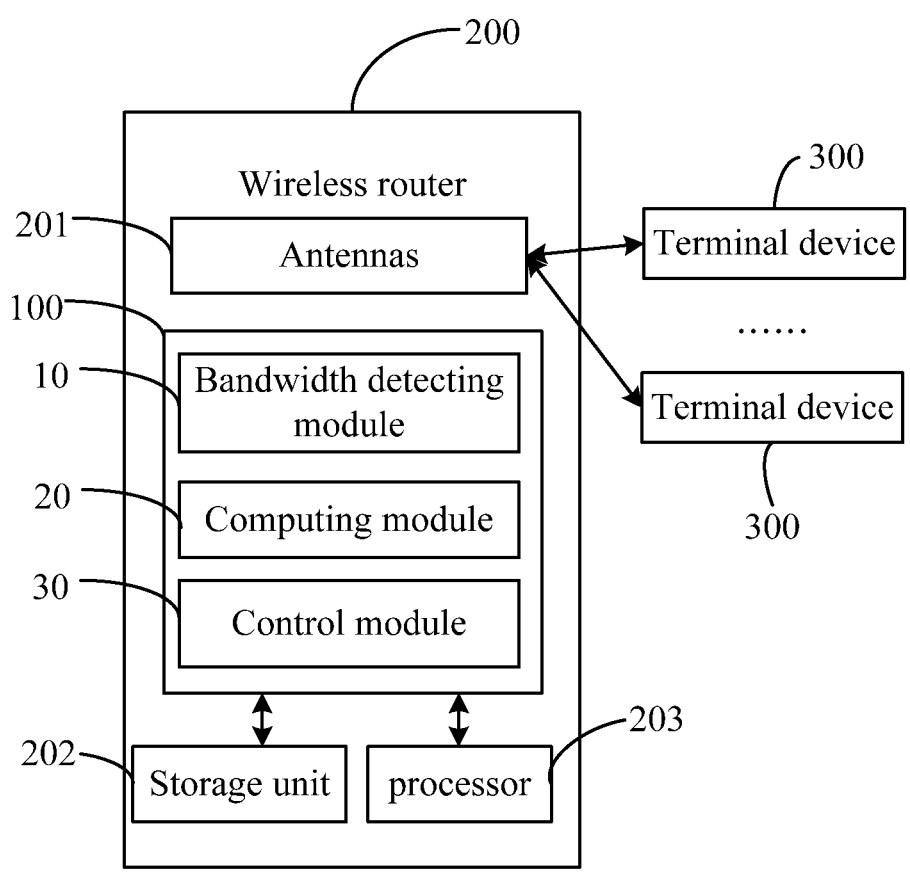
FIG. 1 is a block diagram of an embodiment of an antenna control system.

Referring to FIG. 1, an embodiment of an antenna control system 100 applied in a wireless router 200 is provided. The wireless router 200 communicates with a number of terminal devices 300 via a number of antennas 201. The wireless router 200 further includes a storage unit 202 and a processor 203. The antenna control system 100 is configured to detect a current bandwidth of the terminal devices 300 communicating with the wireless router 200, and turn on or turn off one or more of the antennas 201 according to the detected bandwidth.

The storage unit 202 can be a smart media card, a secure digital card, or a flash card. The storage unit 202 stores computerized codes of the antenna control system 100. The antenna control system 100 includes a number of modules executed by the processor 203 to perform functions of the antenna control system 100.

In this embodiment, the antenna control system 100 includes a bandwidth detecting module 10, a computing module 20, and a control module 30.

The bandwidth detecting module 10 includes various components and/or instructions which may be implemented by the processor 203 to detect the current bandwidth $B_{cur}$ of each terminal device 300 communicating with the wireless router 200, and determine a maximum bandwidth $B_{max}$ of each of the terminal devices 300.

The computing module 20 includes various components and/or instructions, which may be implemented by the processor 203 to compute a weighted sum SUMB of the bandwidths of the terminal devices 300 according to the detected current bandwidth $B_{cur}$ and the maximum bandwidth $B_{max}$ of each terminal device 300.

In this embodiment, a method for computing the weighted sum SUMB includes the following steps: step a) determining a maximum value B among the maximum bandwidths $B_{max}$ of all the terminal devices 300; step b) computing a weight $W_j$ of each terminal device 300 according to a formula $W_j = B_{max(j)}/B$; and step c) computing the weighted sum SUMB according to the following formula: $SUMB = W_1 \times B_{cur(1)} + \ldots + W_i \times B_{cur(i)} + \ldots + \times B_{cur(n)}$. The computing module 20 is further configured to compare the weighted sum SUMB of the bandwidths with a first preset value. In this embodiment, the first preset value is $B \times y\%$, wherein B is the maximum value, and $y\%$ is a preset rate, such as 80%, which can be preset by the user.

In step a), the wireless router 200 can communicate with N terminal devices 300, among which is a terminal device Ni. If a maximum bandwidth $B_{max(i)}$ of the terminal device Ni is the greatest of all the maximum bandwidths of the terminal devices 300, the maximum bandwidth $B_{max(i)}$ of the terminal device Ni is set as the maximum value B.

In step b), the weight of a terminal device Nj ($1 \leq j \leq n$) can be a ratio of the maximum bandwidth $B_{max(j)}$ of the terminal device Nj and the maximum value B.

If the computing module 20 determines that the weighted sum SUMB of the bandwidths is greater than the first preset value, the control module 30 determines whether one or more antennas of the wireless router 200 are turned off. If one or more antennas are turned off, the control module 30 controls the wireless router 200 to turn on at least one of the antennas that is currently in an off state.

If the computing module 20 determines that the weighted sum SUMB of the bandwidth is equal to or less than the first preset value, the computing module 20 further computes a surplus bandwidth. In this embodiment, the surplus bandwidth is calculated by subtracting the weighted sum SUMB of the bandwidth from the maximum value B. The computing module 20 further compares the surplus bandwidth with a total bandwidth of p antennas of the wireless router 200. In this embodiment, the total bandwidth of p antennas is calculated according to the following formula: $B \times (p+z\%)/m$, where m is the total number of the turned on antennas of the router 200; p is the maximum integer less than $(1 - SUMB/B) \times m - z\%$; $z\%$ is a preset rate, such as 20%; and B is the maximum value of the maximum bandwidth of the terminal devices 300.

If the computing module 20 determines that the surplus bandwidth is greater than the bandwidth of the p antennas, the control module 30 controls the wireless router 200 to turn off p antennas. For example, if the surplus bandwidth reaches the total bandwidth provided by p antennas, the control module 30 determines that turning off p antennas will not affect communication between the wireless router 200 and the terminals 300.

Figure 2:
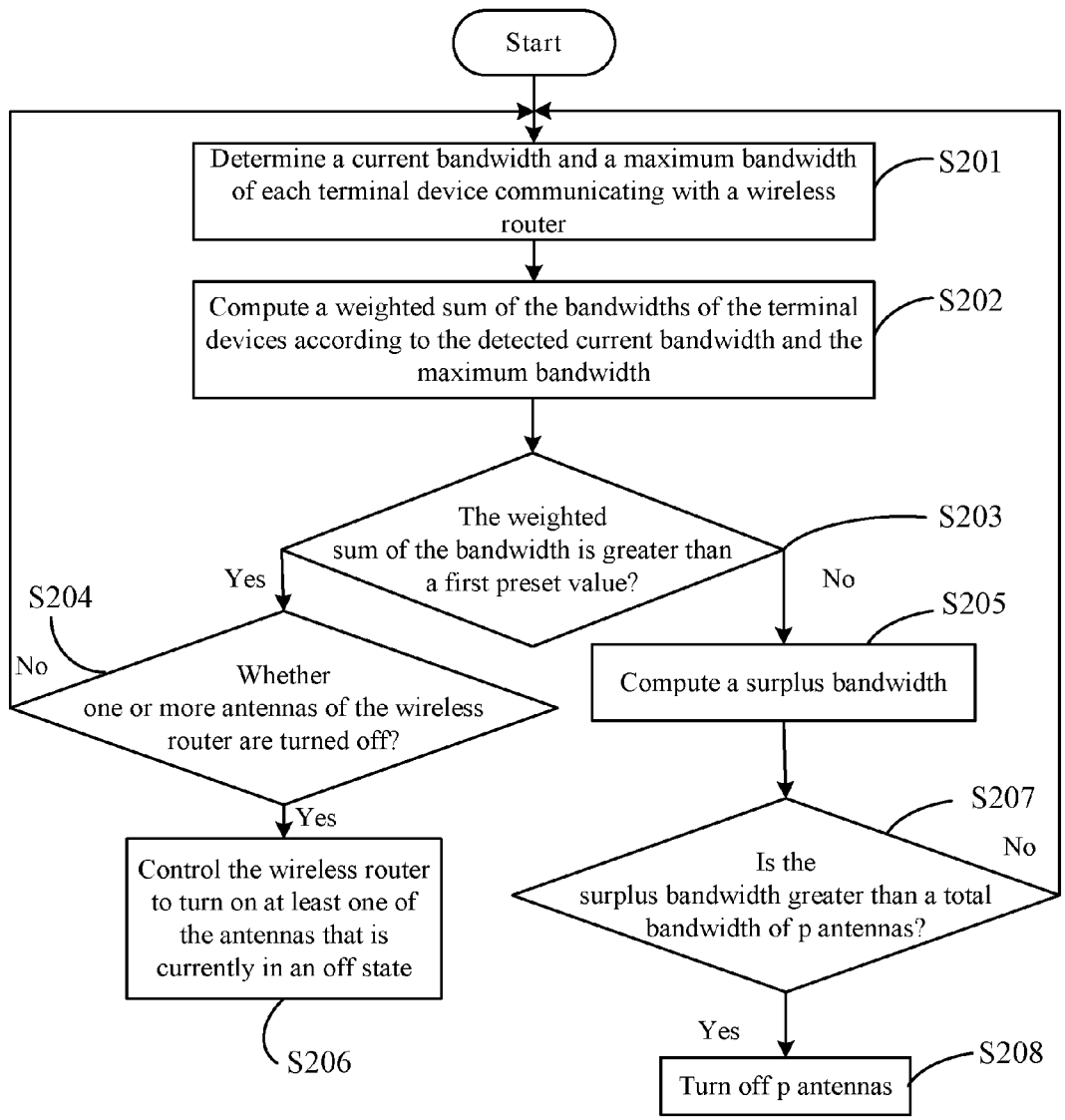
FIG. 2 is a block diagram of an embodiment of an antenna control method.

FIG. 2 is a block diagram of an embodiment of an antenna control method.

In step S201, the bandwidth detecting module 10 detects the current bandwidth $B_{cur}$ of each terminal device 300 communicating with the wireless router 200, and determines a maximum bandwidth $B_{max}$ of each of the terminal devices 300.

In step S202, the computing module 20 computes the weighted sum SUMB of the bandwidths of the terminal devices 300 according to the detected current bandwidth $B_{cur}$ and the maximum bandwidth $B_{max}$ of each terminal device 300.

In step S203, the computing module 20 compares the weighted sum SUMB of the bandwidths with the first preset value, and determines whether the weighted sum SUMB of the bandwidths is greater than the first preset value; if yes, the procedure goes to step S204; if no, the procedure goes to step S205.

In step S204, the control module 30 determines whether one or more antennas of the wireless router 200 are turned off; if yes, the procedure goes to step S205; if no, the procedure goes back to step S201.

In step S205, the computing module 20 computes a surplus bandwidth.

In step S206, the control module 30 controls the wireless router 200 to turn on at least one of the antennas currently in an off state.

In step S207, the computing module determines whether the surplus bandwidth is greater than the total bandwidth of p antennas of the wireless router 200; if yes, the procedure goes to step S208; otherwise, the procedure goes back to step S201.

In step S208, the control module 30 controls the wireless router 200 to turn off p antennas.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A wireless router communicating with a plurality of terminal devices, the wireless router comprising first antennas, second antennas, a memory, a processor, and an antenna control system, wherein the first antennas are currently in an off state, wherein the second antennas are currently in an on state, wherein the antenna control system comprises computerized codes in the form of one or more programs stored in the memory and executed by the processor, wherein the one or more programs comprises:
   a bandwidth detecting module having detecting program codes causing the processor to detect a current bandwidth $B_{cur}$ of each of the plurality of the terminal devices communicating with the wireless router, and determine a maximum bandwidth $B_{max}$ of each of the plurality of the terminal devices;
   a computing module having computing program codes causing the processor to compute a weighted sum SUMB of bandwidths of all of the plurality of the terminal devices according to the detected current bandwidth $B_{cur}$ and the maximum bandwidth $B_{max}$ of each of the plurality of the terminal devices, and obtain a compared result by comparing the weighted sum SUMB of the bandwidths with a first preset value; and
   a control module having controlling program codes causing the processor to turn on at least one of the first antennas or turn off at least one of the second antennas according to the compared result.

2. The wireless router as described in claim 1, wherein the computing module computes the weighted sum SUMB of the bandwidths by:
   determining a maximum bandwidth value B among the maximum bandwidths $B_{max}$ of all of the plurality of the terminal devices;
   computing a weight $W_j$ of each of the plurality of the terminal devices according to a formula $W_j=B_{max(j)}/B$ ($1 \leq j \leq n$); and
   computing the weighted sum SUMB of the bandwidths according to a formula: $SUMB = W_1 \times B_{cur(1)} + \ldots + W_i \times B_{cur(i)} + \ldots + W_n \times B_{cur(n)}$.

3. The wireless router as described in claim 2, wherein the first preset value is B×y %, wherein B is the maximum bandwidth value, and y % is a preset rate.

4. The wireless router as described in claim 3, wherein if the computing module determines that the weighted sum SUMB of the bandwidths is greater than the first preset value, the control module determines whether one or more of the second antennas of the wireless router are turned off, and if the one or more of the second antennas are turned off, the control module controls the wireless router to turn on at least one of the first antennas that is currently in an off state.

5. The wireless router as described in claim 3, wherein if the computing module determines that the weighted sum SUMB of the bandwidths is equal to or less than the first preset value, the computing module further computes a surplus bandwidth, and compares the surplus bandwidth with a total bandwidth of p second antennas of the wireless router; the surplus bandwidth is calculated by subtracting the weighted sum SUMB of the bandwidths from the maximum bandwidth value B; and the total bandwidth of the p second antennas is calculated according to the following formula: B×(p+z %)/m, wherein m is a total number of the second antennas, p is a maximum integer which is less than (1−SUMB/B)×m−z %; z % is a preset rate, and B is the maximum bandwidth value of all of the plurality of the terminal devices.

6. An antenna control method applied in a wireless router, the wireless router communicating with a plurality of terminal devices via first antennas and second antennas, wherein the first antennas are currently in an off state, wherein the second antennas are currently in an on state, the method comprising:
   detecting a current bandwidth $B_{cur}$ of each of the plurality of the terminal devices communicating with the wireless router, and determining a maximum bandwidth $B_{max}$ of each of the plurality of the terminal devices;
   computing a weighted sum SUMB of bandwidths of all of the plurality of the terminal devices according to the detected current bandwidth $B_{cur}$ and the maximum bandwidth $B_{max}$ of each of the plurality of the terminal devices, and obtaining a compared result by comparing the weighted sum SUMB of the bandwidths with a first preset value; and
   turning on one or more of the first antennas or turning off one or more of the second antennas according to the compared result.

7. The antenna control method as described in claim 6, wherein the computing the weighted sum SUMB of the bandwidths comprises the following steps:
   determining a maximum bandwidth value B among the maximum bandwidths $B_{max}$ of all of the plurality of the terminal devices;
   computing a weight $W_j$ of each of the plurality of the terminal devices according to a formula $W_j=B_{max(j)}/B$ ($1 \leq j \leq n$); and
   computing the weighted sum SUMB of the bandwidths according to a formula: $SUMB = W_1 \times B_{cur(1)} + \ldots + W_i \times B_{cur(i)} + \ldots + W_n \times B_{cur(n)}$.

8. The antenna control method as described in claim 7, wherein the first preset value is B×y %, wherein B is the maximum bandwidth value, and y % is a preset rate.

9. The antenna control method as described in claim 8, further comprising:

determining whether one or more of the second antennas of the wireless router are turned off if determining that the weighted sum SUMB of the bandwidths is greater than the first preset value, and if determining that the one or more of the second antennas are turned off, controlling the wireless router to turn on at least one of the first antennas that is currently in an off state.

10. The antenna control method as described in claim 8, further comprising:

computing a surplus bandwidth if determining that the weighted sum SUMB of the bandwidths is equal to or less than the first preset value, and comparing the surplus bandwidth with a total bandwidth of p second antennas of the wireless router; the surplus bandwidth being calculated by subtracting the weighted sum SUMB of the bandwidths from the maximum bandwidth value B; and the total bandwidth of the p second antennas being calculated according to a following formula: $B \times (p+z\%)/m$, wherein m is a total number of the second antennas of the wireless router, p is a maximum integer which is less than $(1-SUMB/B) \times m - z\%$; $z\%$ is a preset rate, and B is the maximum bandwidth value of all of the plurality of the terminal devices.

\* \* \* \* \*